(12) United States Patent
Zhou et al.

(10) Patent No.: US 11,914,484 B2
(45) Date of Patent: *Feb. 27, 2024

(54) DATA BACKUP AND RECOVERY METHOD FOR NVDIMM, NVDIMM CONTROLLER AND NVDIMM

(71) Applicant: XI'AN UNIIC SEMICONDUCTORS CO., LTD., Xi'an (CN)

(72) Inventors: Xiaofeng Zhou, Xi'an (CN); Xiping Jiang, Xi'an (CN)

(73) Assignee: XI'AN UNIIC SEMICONDUCTORS CO., LTD., Xi'an (CN)

( * ) Notice: Subject to any disclaimer, the term of this patent is extended or adjusted under 35 U.S.C. 154(b) by 353 days.

This patent is subject to a terminal disclaimer.

(21) Appl. No.: 17/419,518

(22) PCT Filed: Dec. 24, 2019

(86) PCT No.: PCT/CN2019/127880
§ 371 (c)(1),
(2) Date: Jun. 29, 2021

(87) PCT Pub. No.: WO2020/135411
PCT Pub. Date: Jul. 2, 2020

(65) Prior Publication Data
US 2022/0083435 A1 Mar. 17, 2022

(30) Foreign Application Priority Data
Dec. 29, 2018 (CN) .............................. 201811643227

(51) Int. Cl.
*G06F 11/00* (2006.01)
*G06F 11/14* (2006.01)
*G06F 3/06* (2006.01)

(52) U.S. Cl.
CPC ........ *G06F 11/1469* (2013.01); *G06F 3/0619* (2013.01); *G06F 3/0659* (2013.01); *G06F 3/0679* (2013.01); *G06F 11/1451* (2013.01)

(58) Field of Classification Search
CPC ............. G06F 11/1446; G06F 11/1451; G06F 11/1469; G06F 3/0619; G06F 3/0659; G06F 3/0679
See application file for complete search history.

(56) References Cited

U.S. PATENT DOCUMENTS 9,274,710 B1    3/2016  Oikarinen et al.
10,146,719 B2 * 12/2018 Kondo ................. G11C 29/025
(Continued)

FOREIGN PATENT DOCUMENTS

CN    102378971 A    3/2012
CN    106126447 A   11/2016
(Continued)

OTHER PUBLICATIONS

Mar. 25, 2020, International Search Report for International Patent Application No. PCT/CN2019/127880.

*Primary Examiner* — Elmira Mehrmanesh
(74) *Attorney, Agent, or Firm* — Clements Bernard Walker

(57) ABSTRACT

The NVDIMM (200) comprises a DRAM (201), a NAND flash memory (202) and a NVDIMM controller (100), the NVDIMM controller (100) controlling the NVDIMM (200) and comprising a DDR controller (101), a NAND flash memory controller (102), a data backup module (103) and a data recovery module (104), and the DDR controller (101) using and enabling DBI. The backup method comprises: reading, by the DDR controller (101), N-bit DQ and 1-bit DBI from the DRAM (201) and sending the same to the data backup module; encoding, by the data backup module (103), the N-bit DQ and the 1-bit DBI into N-bit EDQ according (Continued)

to the values of the N-bit DQ and the 1-bit DBI, and sending the N-bit EDQ to the NAND flash memory controller; and receiving, by the NAND flash memory controller (102), the N-bit EDQ and writing the N-bit EDQ into the NAND flash memory (202).

15 Claims, 2 Drawing Sheets

(56) References Cited

U.S. PATENT DOCUMENTS

| | | | |
|---|---|---|---|
| 2009/0228624 A1 | 9/2009 | Maldei et al. | |
| 2010/0052729 A1* | 3/2010 | Brox | G06F 13/4239 365/174 |
| 2016/0147481 A1* | 5/2016 | Best | G11C 7/1006 711/105 |
| 2017/0337951 A1* | 11/2017 | Hollis | G11C 7/1006 |
| 2017/0351566 A1* | 12/2017 | Cordero | G11C 11/4096 |
| 2021/0349660 A1* | 11/2021 | Kim | G06F 13/4072 |

FOREIGN PATENT DOCUMENTS

| | | |
|---|---|---|
| CN | 107239366 A | 10/2017 |
| CN | 107533509 A | 1/2018 |
| CN | 107945833 A | 4/2018 |
| CN | 108255428 A | 7/2018 |
| CN | 109582508 A | 4/2019 |

* cited by examiner

DATA BACKUP AND RECOVERY METHOD FOR NVDIMM, NVDIMM CONTROLLER AND NVDIMM

TECHNICAL FIELD

The present application relates to the field of non-volatile memory, and in particular to a low-power data backup method and data recovery method for a Non-Volatile Dual In-line Memory Module (NVDIMM), an NVDIMM controller and an NVDIMM.

BACKGROUND ART

NVDIMM is a non-volatile memory, including a Dynamic Random Access Memory (DRAM), a Not AND (NAND) flash memory (NAND Flash) and an NVDIMM controller. When a motherboard/CPU is abnormal or powered down, the NVDIMM controller is notified through interruptions or messages, and then the NVDIMM controller backs up data from a DRAM to a NAND flash memory. Thereafter, when the motherboard/CPU is powered up again, it notifies the NVDIMM controller to recover the data backup from the NAND flash memory to the DRAM, and charge supercapacitors. During data backup, the NVDIMM is powered by supercapacitors; nevertheless, the power supply capability of supercapacitors is limited and is largely attenuated as the service time and operating temperature increase. For an NVDIMM, the power consumption of data backup and the time of data backup/recovery are two important product performance indicators, which determine the capacity and reliability of supercapacitors and the cost of product. The increase in power consumption of data backup inevitably requires an increase in the capacity of supercapacitors, which in turn may increase the cost and reduce the reliability; additionally, the data backup/recovery time determines the power consumption and user experience during data backup. Therefore, a low-power and fast NVDIMM data backup and recovery method can significantly improve the competitiveness of product.

In order to reduce the power consumption of an interface, a Data Bus Inversion (DBI) mechanism is introduced into a Double Data Rate 4 (DDR4). For a NVDIMM controller with JEDEC specification (JESD245A/B), both DDRx and NAND flash memory interfaces need to be operated during data backup and recovery. DDR4 can reduce the power consumption of an interface by 25%-40% by using 1.2V interface voltage in combination with Pseudo Open Drain (POD) technology and DBI mechanism. Although the existing NVDIMM products may significantly reduce the operating power consumption of DRAM by using the DBI mechanism in the DDR (DDR4), during data backup, it is necessary to write data backup and DBI information together into the NAND flash memory, so as to give DBI information when the data is recovered such that the DRAM can get the correct data. The backup of DBI may bring additional storage overhead to NVDIMM data backup, and at the same time increase the power consumption of backup operation. Taking 16 GB NVDIMM DDR4×8 as an example, the backup of DBI requires a storage space increased by 2 GB, which increases the backup and recovery time by ⅛, and also increases the backup power consumption by about ⅛.

Chinese Patent Publication CN108255428A discloses a data processing method, device and electronic equipment. The data method comprises: receiving a data transmission request, wherein the data transmission request indicates the transmission of the data stored in an NVDIMM to a block device, and the data transmission request carries an identifier for a data block; determining the storage location information of the target data in the NVDIMM according to the data transmission request, wherein the target data is the data to be transmitted corresponding to the data transmission request; transmitting the target data indicated by the storage location information in the NVDIMM directly to the block device in a byte access manner. Nevertheless, this method reduces the data transmission time from the perspective of the use of NVDIMM by a motherboard/CPU, and requires that the data stored in the NVDIMM has certain characteristics; and it does not start from the design perspective of the NVDIMM. Therefore, this method does not have universal low-power and fast NVDIMM data backup and recovery characteristics.

SUMMARY OF THE APPLICATION

For NVDIMM controllers that use the DBI mechanism, the power consumption of a DDR interface can be significantly reduced. Nevertheless, the storage of the DBI information increases the storage space, and the power consumption of a NAND flash memory interface during data backup, and at the same time the data backup and recovery time. Therefore, the object of the present application is to solve the following problems:
   (i) how to store DBI information after the introduction of DBI mechanism so as to reduce the power consumption of NVDIMM data backup;
   (ii) how to store DBI information after the introduction of DBI mechanism so as to reduce the data backup and recovery time of an NVDIMM.

The present application solves the above-mentioned technical problems through the following aspects.

According to a first aspect of the present application, there is provided a data backup method for an NVDIMM, wherein the NVDIMM comprises a DRAM, a NAND flash memory and an NVDIMM controller, the NVDIMM controller controlling the NVDIMM and comprising a DDR controller, a NAND flash memory controller and a data backup module, and wherein the DDR controller uses and enables DBI, the data backup method comprising:
   reading, by the DDR controller, N-bit Data Queue (DQ) DQ and 1-bit Data Bus Inversion (DBI) from the DRAM, and sending the same to the data backup module;
   encoding, by the data backup module, the N-bit DQ and the 1-bit DBI into N-bit Encoded Data Queue (EDQ) EDQ according to the values of the N-bit DQ and the 1-bit DBI, and
   sending the N-bit EDQ to the NAND flash memory controller; and
   receiving, by the NAND flash memory controller, the N-bit EDQ, and writing the N-bit EDQ into the NAND flash memory.

In the present application, N=8*m, wherein m is a positive integer. When the DRAM is DDR4×8, N is 8.

According to a preferred embodiment of the first aspect of the present application, when under the condition that the N-bit DQ contains N/2 "1"s, the N-bit DQ is encoded into N-bit EDQ that is identical therewith; under the condition that the number of "1"s in the N-bit DQ is not N/2, the N-bit DQ is index mapped to the N−1 bits in the N-bit EDQ, in which N-bit EDQ the number of "1"s is not N/2, and 1-bit DBI is written into the remaining one bit in the N-bit EDQ.

According to a preferred embodiment of the first aspect of the present application, the DRAM is DDR4.

In a preferred embodiment according to the first aspect of the present application, the DRAM is DDR4×8 or DDR4×16.

According to a preferred embodiment of the first aspect of the present application, under the condition that the DRAM is DDR4×8, the N-bit DQ is 8-bit DQ, and under the condition that the 8-bit DQ contains four "1"s, the 8-bit DQ is encoded into 8-bit EDQ that is identical therewith, under the condition that the 8-bit DQ contains five to eight "1"s, the 8-bit DQ is index mapped to seven bits in the 8-bit EDQ, in which 8-bit EDQ the number of "1"s is not four, and the 1-bit DBI is written into the According to a second aspect of the present application, there is provided a data recovery method for an NVDIMM, wherein the NVDIMM comprises a DRAM, a NAND flash memory and an NVDIMM controller, the NVDIMM controller controlling the NVDIMM and comprising a DDR controller, a NAND flash memory controller and a data recovery module, wherein the DDR controller uses and enables DBI, the data backup recovery method comprising:

reading, by the NAND flash memory controller, N-bit EDQ data from the NAND flash memory, and sending the same to the data recovery module;

receiving, by the data recovery module, the N-bit EDQ data, decoding the N-bit EDQ data into N-bit DQ and 1-bit DBI and sending the N-bit DQ and the 1-bit DBI to the DDR controller;

pulling down or up, by the DDR controller, a DBI signal at the interface of the DDR controller according to the value of the 1-bit DBI, and sending the N-bit DQ to the DRAM.

In the present application, N=8*m, wherein m is a positive integer. When the DRAM is DDR4×8, N is 8.

According to a preferred embodiment of the second aspect of the present application, under the condition that the N-bit EDQ contains N/2 "1"s, the N-bit DQ is identical with the N-bit EDQ; under the condition that the number of "1"s in the N-bit EDQ is not N/2, the N-bit EDQ is inversely mapped to the N-bit DQ and 1-bit DBI.

According to a preferred embodiment of the second aspect of the present application, the DRAM is DDR4.

According to a preferred embodiment of the second aspect of the present application, the DRAM is DDR4.8 or DDR4×16.

According to a preferred embodiment of the second aspect of the present application, under the condition that the DRAM is DDR4×8, the EDQ is 8-bit EDQ; and under the condition that the 8-bit EDQ contains four "1"s, the DQ is identical with the EDQ, and under the condition that the 8-bit EDQ does not contain four "1"s, the 8-bit EDQ is inversely mapped to the 8-bit DQ and the 1-bit DBI.

According to a third aspect of the present application, there is provided an NVDIMM controller, wherein the NVDIMM controller comprises a DDR controller and a NAND flash memory controller, and is used to control an NVDIMM, the NVDIMM comprising a DRAM and a NAND flash memory, wherein the DDR controller uses and enables DBI, wherein the NVDIMM controller further comprising:

a data backup module for encoding the N-bit DQ and the 1-bit DBI read by the DDR controller from the DRAM into N-bit EDQ, and sending the same to the NAND flash memory controller; and a data recovery module for decoding the N-bit EDQ read by the NAND flash memory controller from the NAND flash memory into N-bit DQ and 1-bit DBI, and sending the same to the DDR controller.

In the present application, N=8*m, wherein m is a positive integer. When the DRAM is DDR4×8, N is 8.

According to a preferred embodiment of the third aspect of the present application, the data backup module is used for under the condition that the N-bit DQ contains N/2 "1"s, causing the N-bit EDQ to be identical with the N-bit DQ, and the data backup module is used for under the condition that the number of "1"s in the N-bit DQ is not N/2, index mapping the N-bit DQ into N−1 bits in the N-bit EDQ, in which N-bit EDQ the bit number of "1"s is not N/2, and writing 1-bit DBI into the remaining one bit in the N-bit EDQ.

According to a preferred embodiment of the third aspect of the present application, the DRAM is DDR4.

According to a preferred embodiment of the third aspect of the present application, the DRAM is DDR4×8 or DDR4×16.

According to a preferred embodiment of the third aspect of the present application, under the condition that the DDR4 is DDR4×8, the EDQ is 8-bit EDQ, and the data backup module is used for under the condition that the 8-bit EDQ contains four "1"s, encoding the 8-bit DQ into the 8-bit EDQ that is identical therewith, and the data backup module is used for under the condition that the 8-bit EDQ contains five to eight "1"s, index mapping the 8-bit DQ into seven bits in the 8-bit EDQ, in which 8-bit EDQ the number of "1"s is not four, and writing 1-bit DBI into the remaining one bit in the 8-bit EDQ.

According to a preferred embodiment of the third aspect of the present application, the data recovery module is used for under the condition that the 8-bit EDQ contains four "1"s, causing the DQ to be identical with the EDQ, and the data recovery module is used for under the condition that the 8-bit EDQ does not contain four "1"s, inversely mapping the 8-bit EDQ into 8-bit DQ and 1-bit DBI.

According to a fourth aspect of the present application, there is provided an NVDIMM, comprising an NVDIMM controller according to the third aspect mentioned above.

The NVDIMM controller according to the present application is directed to DDR that uses DBI mechanism. (i) During data backup, the DBI mechanism in the DDR is enabled to read the data backup and the DBI information from the DDR interface, and to encode the DBI information into the data according to the characteristics of the data, and to reduce the number of NAND data to be written and thus to reduce the operating power consumption of the NAND interface and the data backup time. (ii) During data recovery, the data backup encoded with DBI information is read from the NAND flash memory, and the data backup is decoded to obtain the DBI information and the data to be recovered to the DRAM, and the DBI mechanism is also used to reduce the operating power consumption of the DDR interface when data is recovered and written into the DRAM. Compared with the method of reducing power consumption based on data characteristics in an NVDIMM, the present application, starting from the design perspective of an NVDIMM, reduces the amount of data written to the NAND flash memory so as to reduce the power consumption and data backup time, and does not impose any restriction or requirement on the application of a host.

DESCRIPTION OF THE FIGURES

The present application will be better understood through the following detailed description in conjunction with the figures. It should be understood that these figures are for illustrative purpose only and are not necessarily drawn in scale. In the figures.

DETAILED DESCRIPTION

According to the present application, an NVDIMM controller achieves the non-volatile function mainly by a DDR controller, a NAND flash memory controller and a data backup/recovery module, the three of which are all implemented using FPGA or ASIC. The DDR controller is used for controlling a DRAM, and the NAND flash memory controller is used for controlling a NAND flash memory. The present application is directed to DDR that uses DBI mechanism, wherein during the data backup/recovery, the data backup/recovery module performs encoding/decoding on both DQ and DBI, to achieve low power consumption of interfaces and in the meantime speed increase of data backup/recovery. DDR hereinafter refers to DDR4; nevertheless, it should be understood that the present application is not limited to DDR4, and is also applicable to other existing and future DDR versions that support DBI mechanism.

Figure 1:
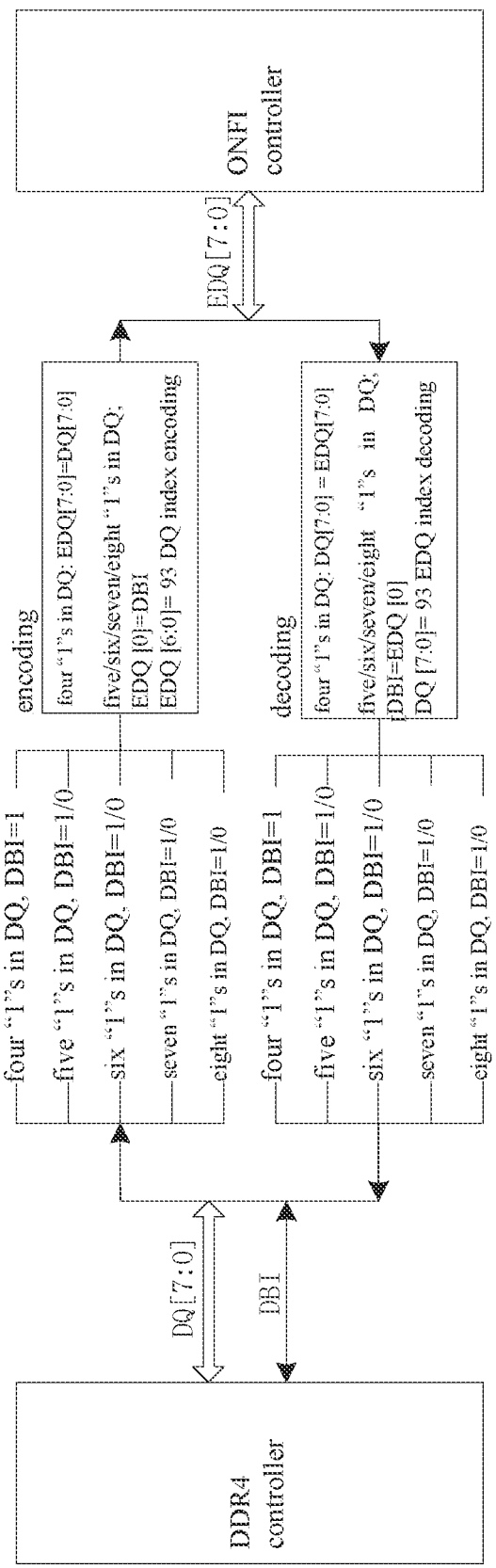
FIG. 1 is a system block diagram of an NVDIMM controller according to an embodiment of the present application.

FIG. 1 shows a data backup method and a data recovery method according to one embodiment of the present application. Taking DDR4×8 as an example, the interface signal related to the DDR controller is 8-bit DQ and 1-bit DBI, and the interface signal related to the NAND flash memory controller is Encoded DQ (EDQ).

The data backup method for an NVDIMM controller will be described in detail below.

The DDR controller reads data from a DRAM. Due to the DBI mechanism, there are nine possible relationships between the number of "1"s in DQ and the DBI. As shown in Table 1, when DBI is "0", it is indicated that the DQ data is inverted, and otherwise the DQ data is not inverted.

TABLE 1

Values and relationships between DQ and DBI

| DQ[7:0] | DBI | Description |
| --- | --- | --- |
| four "1"s in DQ | 1 | DQ is not inverted. |
| five "1"s in DQ | 1 | DQ is not inverted. |
| five "1"s in DQ | 0 | DQ is inverted. |
| six "1"s in DQ | 1 | DQ is not inverted. |
| six "1"s in DQ | 0 | DQ is inverted. |
| seven "1"s in DQ | 1 | DQ is not inverted. |
| seven "1"s in DQ | 0 | DQ is inverted. |
| eight "1"s in DQ | 1 | DQ is not inverted. |
| eight "1"s in DQ | 0 | DQ is inverted. |

As can be known from Table 1, when DBI is 1, the data actually stored in the DRAM is the same as the DQ read by the DDR controller; when DBI is 0, the data actually stored in the DRAM is opposite to the DQ read by the DDR controller.

According to the characteristics of DQ that there are only four/five/six/seven/eight "1"s in 8-bit data, the data backup method of the present application creatively encodes both of DQ and DBI to generate 8-bit EDQ. As shown in Table 2, in the data backup module, 8-bit DQ and 1-bit DBI are represented by 8-bit EDQ through encoding, wherein the EDQ is written into the NAND flash memory by the NAND flash memory controller to complete data backup.

TABLE 2

Encoding relationship table of DQ, DBI and EDQ

| DQ[7:0] | DBI | Numbers of Possible Data | EDQ[7:0] |
| --- | --- | --- | --- |
| four "1"s in DQ | 1 | $C_8^4 = 70$ | EDQ[7:0] = DQ[7:0] |
| five "1"s in DQ | 0/1 | $C_8^5 = 56$ | One bit in EDQ represents DBI, |
| six "1"s in DQ | 0/1 | $C_8^6 = 28$ | and the remaining seven bits |
| seven "1"s in DQ | 0/1 | $C_8^7 = 8$ | represent index mapping of 93 |
| eight "1"s in DQ | 0/1 | $C_8^8 = 1$ | possible DQ values. |

In order to distinguish the case where there are five/six/seven/eight "1"s in DQ from the case where there are four "1"s in DQ, when DBI=1, the 7-bit EDQ that represents the index mapping of 93 possible DQ values does not contain three "1"s; when DBI=0, the 7-bit EDQ that represents the index mapping of 93 possible DQ values does not contain four "1"s.

For example, in one embodiment, when DBI=1, EDQ[7]=DBI, and EDQ[6:0] represents the index mapping of 93 possible DQ values, EDQ[6:0] does not contain three "1"s; when DBI=0, EDQ[7]=DBI, and EDQ[6:0] represents the index mapping of 93 possible DQ values, EDQ[6:0] does not contain four "1"s.

In the above embodiment, the DBI information is a high bit in the EDQ. Nevertheless, it should be understood that the DBI information can be in any position in the EDQ.

When an NVDIMM controller recovers data, the steps comprises: (i) a NAND flash memory controller reads the EDQ data which is written during the backup from a NAND flash memory; (ii) a data recovery module decodes the EDQ data, obtains the decoded DQ and DBI, and sends the decoded DQ and DBI to a DDR controller, the decoding process being the inverse process as illustrated in Table 2; if the EDQ contains four '1's, no decoding is required, and otherwise, 8-bit EDQ is inversely mapped to 8-bit DQ and 1-bit DBI; (iii) the DDR controller, according to the value of the DBI, pulls down/up the DBI signal at the interface of the DDR controller, and sends DQ to the DRAM, which DRAM determines, according to the value of the DBI, whether to invert the DQ, thereby completing data recovery.

In the above description, DDR4×8 is taken as an example for illustration. Nevertheless, it should be understood that the present application is also applicable to DDR4×16.

Figure 2:
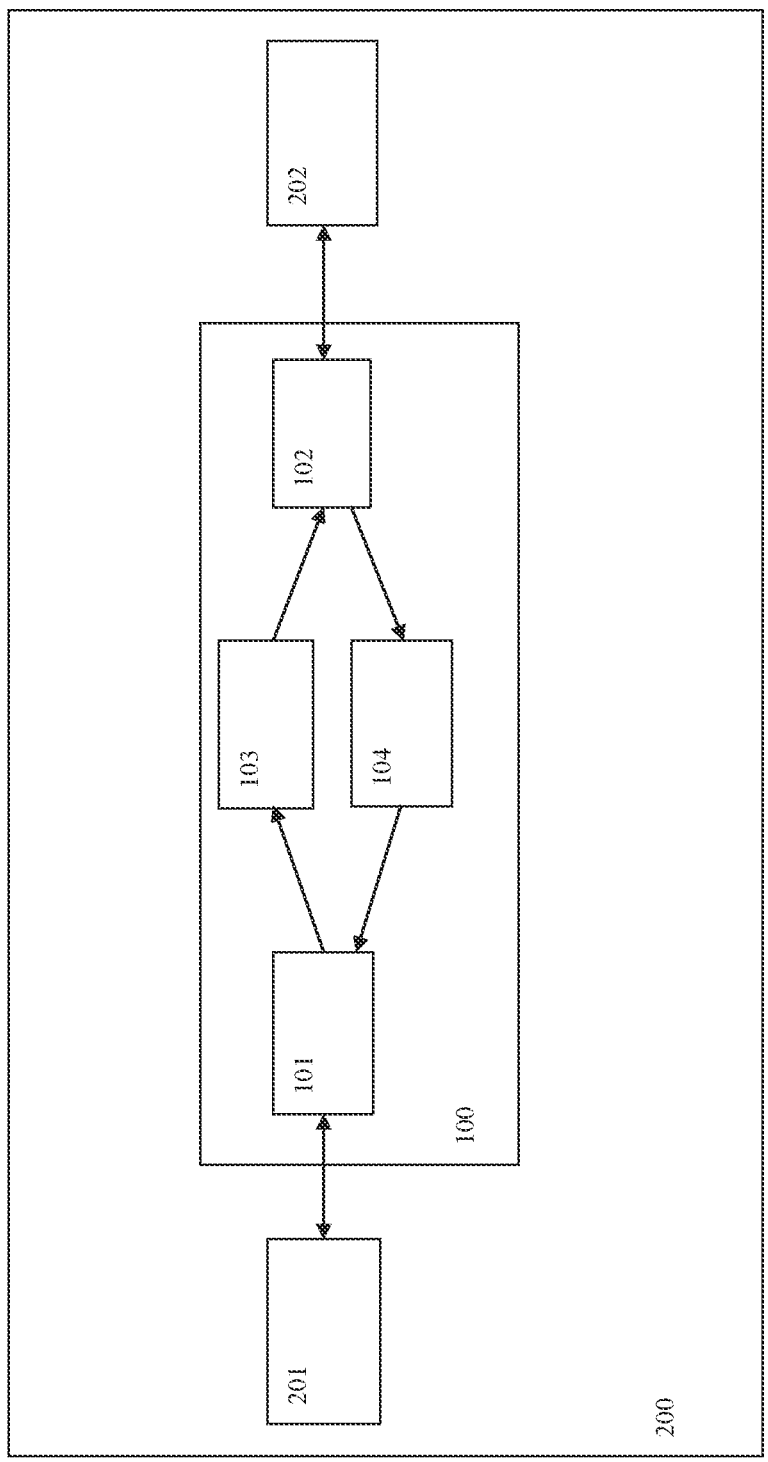
FIG. 2 is a schematic diagram of an NVDIMM according to an embodiment of the present application.

FIG. 2 is a schematic diagram of an NVDIMM according to an embodiment of the present application. As shown in FIG. 2, an NVDIMM controller 100 includes a DDR controller 101, a NAND flash memory controller 102, a data backup module 103, and a data recovery module 104. The NVDIMM controller controls an NVDIMM 200 including a DRAM 201 and a NAND flash memory 202, and the data recovery/backup module implements the data backup method and the data recovery method described above with respect to FIG. 1. The DDR controller is coupled to the DRAM. The NAND flash memory controller is coupled to the NAND flash memory. The data backup module is coupled to the DDR controller and the NAND flash memory controller, and the data recovery module is coupled to the DDR controller and the NAND flash memory controller.

It should be understood that these embodiments are only for illustrative purpose, those skilled in the art can make many variations, and the scope of the present application is defined by the claims.

The invention claimed is:

1. A data backup method for a Non-Volatile Dual In-line Memory Module (NVDIMM), wherein the NVDIMM comprises a Dynamic Random Access Memory (DRAM), a Not AND (NAND) flash memory and an NVDIMM controller, the NVDIMM controller controlling the NVDIMM and comprising a Double Data Rate (DDR) controller, a NAND flash memory controller and a data backup module, and wherein the DDR controller uses and enables Data Bus Inversion (DBI), the data backup method comprising:
   reading, by the DDR controller, N-bit Data Queue (DQ) DQ and 1-bit DBI from the DRAM, and sending the N-bit DQ and 1-bit DBI to the data backup module;
   encoding, by the data backup module, the N-bit DQ and the 1-bit DBI into N-bit Encoded Data Queue (EDQ) according to values of the N-bit DQ and the 1-bit DBI, and
   sending the N-bit EDQ to the NAND flash memory controller; and
   receiving, by the NAND flash memory controller, the N-bit EDQ, and writing the N-bit EDQ into the NAND flash memory, wherein under a condition that the N-bit DQ contains N/2 "1"s, the N-bit DQ is encoded into N-bit EDQ that is identical therewith; under a condition that number of "1"s in the N-bit DQ is not N/2, the N-bit DQ is index mapped to N−1 bits in the N-bit EDQ, in which N-bit EDQ number of "1"s is not N/2, and 1-bit DBI is written into remaining one bit in the N-bit EDQ.

2. The data backup method according to claim 1, wherein the DRAM is DDR4.

3. The data backup method according to claim 2, wherein the DRAM is DDR4×8 or DDR4×16.

4. The data backup method according to claim 3, wherein under a condition that the DRAM is DDR4×8, the N-bit DQ is 8-bit DQ, and under a condition that the 8-bit DQ contains four "1"s, the 8-bit DQ is encoded into 8-bit EDQ that is identical therewith; under a condition that the 8-bit DQ contains five to eight "1"s, the 8-bit DQ is index mapped to seven bits in the 8-bit EDQ, in which 8-bit EDQ number of "1"s is not four, and the 1-bit DBI is written into remaining one bit in the 8-bit EDQ.

5. A data recovery method for a Non-Volatile Dual In-line Memory (NVDIMM), wherein the NVDIMM comprises a Dynamic Random Access Memory (DRAM), a Not AND (NAND) flash memory and an NVDIMM controller, the NVDIMM controller controlling the NVDIMM and comprising a Double Data Rate (DDR) controller, a NAND flash memory controller and a data recovery module, wherein the DDR controller uses and enables Data Bus Inversion (DBI), the data recovery method comprising:
   reading, by the NAND flash memory controller, N-bit Encoded Data Queue (EDQ) data from the NAND flash memory, and sending the N-bit EDQ data to the data recovery module;
   receiving, by the data recovery module, the N-bit EDQ data, decoding the N-bit EDQ data into N-bit DQ and 1-bit DBI and sending the N-bit Data Queue (DQ) and the 1-bit DBI to the DDR controller;
   pulling down or up, by the DDR controller, a DBI signal at an interface of the DDR controller according to value of the 1-bit DBI, and sending the N-bit DQ to the DRAM, wherein under a condition that the N-bit EDQ contains N/2 "1"s, the N-bit DQ is identical with the N-bit EDQ, under a condition that number of "1"s in the N-bit EDQ is not N/2, the N-bit EDQ is inversely mapped to the N-bit DQ and 1-bit DBI.

6. The data recovery method according to claim 5, wherein the DRAM is DDR4.

7. The data recovery method according to claim 6, wherein the DRAM is DDR4×8 or DDR4×16.

8. The data recovery method according to claim 7, wherein under a condition that the DRAM is DDR4×8, EDQ is 8-bit EDQ; and under a condition that the 8-bit EDQ contains four "1"s, DQ is identical with the EDQ, and under a condition that the 8-bit EDQ does not contain four "1"s, the 8-bit EDQ is inversely mapped to the 8-bit DQ and the 1-bit DBI.

9. A Non-Volatile Dual In-line Memory Module (NVDIMM) controller, wherein the NVDIMM controller comprises a Double Data Rate (DDR) controller and a Not AND (NAND) flash memory controller, and is used to control an NVDIMM, the NVDIMM comprising a Dynamic Random Access Memory (DRAM) and a NAND flash memory, wherein the DDR controller uses and enables Data Bus Inversion (DBI), wherein the NVDIMM controller further comprises:
   a data backup module for encoding N-bit Data Queue (DQ) and 1-bit DBI read by the DDR controller from the DRAM into N-bit Encoded Data Queue (EDQ), and sending the N-bit EDQ to the NAND flash memory controller; and
   a data recovery module for decoding the N-bit EDQ read by the NAND flash memory controller from the NAND flash memory into N-bit DQ and 1-bit DBI, and sending the N-bit DQ and 1-bit DBI to the DDR controller, wherein the data backup module is used for under a condition that the N-bit DQ contains N/2 "1"s, causing the N-bit EDQ to be identical with the N-bit DQ, and the data backup module is used for under a condition that number of "1"s in the N-bit DQ is not N/2, index mapping the N-bit DQ into N−1 bits in the N-bit EDQ, in which N-bit EDQ number of "1"s is not N/2, and writing 1-bit DBI into remaining one bit in the N-bit EDQ.

10. The NVDIMM controller according to claim 9, wherein the data recovery module is used for under a condition that the N-bit EDQ contains N/2 "1"s, decoding the N-bit EDQ into the N-bit DQ that is identical therewith, and the data recovery module is used for under a condition that number of "1" in the N-bit EDQ is not N/2, inversely mapping the N-bit EDQ into N-bit DQ and 1-bit DBI.

11. The NVDIMM controller according to claim 9, wherein the DRAM is DDR4.

12. The NVDIMM controller according to claim 11, wherein the DDR4 is DDR4×8 or DDR4×16.

13. The NVDIMM controller according to claim 12, wherein under a condition that the DDR4 is DDR4×8, the EDQ is 8-bit EDQ, and the data backup module is used for under a condition that the 8-bit EDQ contains four "1"s, encoding the 8-bit DQ into the 8-bit EDQ that is identical therewith, and the data backup module is used for under a condition that the 8-bit EDQ contains five to eight "1"s, index mapping the 8-bit DQ into seven bits in the 8-bit EDQ, in which 8-bit EDQ number of "1"s is not four, and writing 1-bit DBI into remaining one bit in the 8-bit EDQ.

14. The NVDIMM controller according to claim 13, wherein the data recovery module is used for under a condition that the 8-bit EDQ contains four "1"s, causing the DQ to be identical with the EDQ, and the data recovery module is used for under a condition that the 8-bit EDQ does not contain four "1"s, inversely mapping the 8-bit EDQ into 8-bit DQ and 1-bit DBI.

15. A Non-Volatile Dual In-line Memory Module (NVDIMM), comprising the NVDIMM controller as claimed in claim 9.

\* \* \* \* \*